United States Patent
Ayichew et al.

(10) Patent No.: US 10,059,318 B2
(45) Date of Patent: Aug. 28, 2018

(54) EMERGENCY BRAKE SYSTEM WITH DUAL INPUT

(71) Applicant: Goodrich Corporation, Charlotte, NC (US)

(72) Inventors: Efrem E. Ayichew, Troy, OH (US); Herbert S. Summers, Trotwood, OH (US)

(73) Assignee: Goodrich Corporation, Charlotte, NC (US)

(*) Notice: Subject to any disclaimer, the term of this patent is extended or adjusted under 35 U.S.C. 154(b) by 50 days.

(21) Appl. No.: 15/234,750

(22) Filed: Aug. 11, 2016

(65) Prior Publication Data

US 2018/0043874 A1 Feb. 15, 2018

(51) Int. Cl.
*B60T 11/10* (2006.01)
*B60T 7/10* (2006.01)

(52) U.S. Cl.
CPC ............. *B60T 11/102* (2013.01); *B60T 7/102* (2013.01)

(58) Field of Classification Search
CPC .............................. B60T 11/102; B60T 7/102
See application file for complete search history.

(56) References Cited

U.S. PATENT DOCUMENTS

| | | | | |
|---|---|---|---|---|
| 2,781,114 A * | 2/1957 | Slee | ............ | F01L 13/00 188/271 |
| 3,175,647 A * | 3/1965 | Fabbro | ............ | B60T 11/102 188/106 F |
| 4,296,867 A | 10/1981 | Thompson | | |
| 4,572,335 A * | 2/1986 | Kobelt | ............ | F16D 55/2245 188/72.1 |
| 2004/0124697 A1 | 7/2004 | MacGregor | | |
| 2009/0014261 A1 | 1/2009 | Edelson et al. | | |
| 2012/0152672 A1* | 6/2012 | Jenkins | ............ | B60T 7/102 188/322.13 |
| 2014/0014447 A1* | 1/2014 | O'Connell | ............ | B64C 25/44 188/151 R |
| 2016/0124428 A1 | 5/2016 | Nutaro et al. | | |

FOREIGN PATENT DOCUMENTS

| | | |
|---|---|---|
| CN | 201010043 | 1/2008 |
| FR | 2597820 | 10/1987 |
| GB | 672208 | 5/1952 |
| WO | 2007050407 | 5/2007 |
| WO | 2015009778 | 1/2015 |

OTHER PUBLICATIONS

Extended European Search Report dated Dec. 21, 2017 in European Application No. 17184343.6.

* cited by examiner

*Primary Examiner* — Melody M Burch
(74) *Attorney, Agent, or Firm* — Snell & Wilmer L.L.P.

(57) ABSTRACT

Systems and methods for emergency brake systems are provided herein. In this regard, a brake system may comprise a summing lever having a first end and a second end, a brake handle coupled to the first end of the summing lever, the brake handle rotatably coupled about a first axis, and a linear actuator having a plunger, the plunger being coupled to the second end of the summing lever. In various embodiments, an idler link may be coupled between the brake handle and the first end of the summing lever. The brake system may further comprise a brake cable coupled between the summing lever and a brake metering valve. The brake metering valve may be actuated in response to at least one of the brake handle being rotated about the first axis or the linear actuator being actuated.

18 Claims, 9 Drawing Sheets

EMERGENCY BRAKE SYSTEM WITH DUAL INPUT

FIELD

The present disclosure relates generally to the field of vehicle brake control, and more specifically to systems and methods for aircraft emergency brake control systems.

BACKGROUND

Generally, an aircraft emergency brake system includes an emergency brake metering valve coupled to a handle located in the cockpit of the aircraft via a cable. The emergency brake metering valve is controllable in response to the brake handle exerting a force on the cable. In this regard, the cable may be coupled directly between the handle and the emergency brake metering valve.

SUMMARY

Systems and methods disclosed herein may be useful for brake control systems. In this regard, an emergency brake system may comprise a summing lever, an idler link coupled to the summing lever, a brake handle coupled to the idler link, the brake handle rotatably coupled about a first axis, and a linear actuator having a plunger, the plunger being coupled to the summing lever, wherein the summing lever is coupled between the linear actuator and the idler link, and the idler link is coupled between the summing lever and the brake handle.

In various embodiments, the summing lever may comprise a first end and a second end and the idler link may comprise a first terminus and a second terminus, the first terminus being coupled to the brake handle, the second terminus being coupled to the first end, and the second end being coupled to the plunger. The second end may be pivotally coupled to the plunger, the first end may be pivotally coupled to the second terminus, and the first terminus may be pivotally coupled to the brake handle. The plunger may be configured to at least one of retract or extend from the linear actuator along a second axis. The second axis may be fixed relative to the first axis. The emergency brake system may further comprise a brake cable, the brake cable being coupled to the summing lever. The emergency brake system may further comprise a brake metering valve, the brake cable being coupled to the brake metering valve. The brake metering valve may be configured to actuate in response to the brake handle pivoting about the first axis. The brake metering valve may be configured to actuate in response to the plunger moving along the second axis.

An emergency brake system may comprise a summing lever having a first end and a second end, a brake handle coupled to the first end of the summing lever, the brake handle rotatably coupled about a first axis, and a linear actuator having a plunger, the plunger being coupled to the second end of the summing lever.

In various embodiments, the linear actuator may comprise an attachment feature, the linear actuator being rotatable about the attachment feature. The second end of the summing lever may be pivotally coupled to the plunger and the first end of the summing lever may be pivotally coupled to the brake handle. The plunger may be configured to at least one of retract or extend from the linear actuator along a second axis. An orientation of the second axis may move in response to the brake handle rotating about the first axis. The emergency brake system may further comprise a brake cable, the brake cable being coupled to the summing lever. The emergency brake system may further comprise a brake metering valve, the brake cable being coupled to the brake metering valve. The brake metering valve may be configured to actuate in response to the brake handle pivoting about the first axis. The brake metering valve may be configured to actuate in response to the plunger moving along the second axis.

A method of controlling a brake metering valve may comprise rotating a brake handle about a first axis, the brake handle being coupled to a summing lever, moving, by the brake handle, the summing lever in response to the rotating, exerting, by the summing lever, a force onto a brake cable, in response to the moving the summing lever by the brake handle, and actuating, via the brake cable, the brake metering valve, in response to the exerting the force.

In various embodiments, the method may further comprise actuating a linear actuator, moving, by the linear actuator, the summing lever in response to the actuating the linear actuator, exerting, by the summing lever, a second force onto the brake cable in response to the moving the summing lever by the linear actuator, actuating, via the brake cable, the brake metering valve, in response to the exerting the second force, and metering, by the brake metering valve, a flow of hydraulic fluid, in response to the actuating the brake metering valve in response to at least one of the exerting the force or exerting the second force.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In the context of the present disclosure, systems and methods may find particular use in connection with aircraft brake systems. However, various aspects of the disclosed embodiments may be adapted for optimized performance with a variety of components and in a variety of systems. As such, numerous applications of the present disclosure may be realized.

An emergency brake system, as disclosed herein, may include a summing lever being coupled to a brake handle at a first end and a linear actuator at a second end, in accordance with various embodiments. The summing lever may be coupled to a brake cable at point location between the first end and the second end. Actuation of either the brake handle, or the linear actuator may move the brake cable connection point on the summing lever thereby applying a pulling force to the brake cable. The brake cable may be coupled to an emergency brake metering valve. In this regard, the emergency brake metering valve may be controlled by two independently controlled inputs (i.e., the brake handle and/or the linear actuator) via a single brake cable. In this regard, as aircraft become fully remotely piloted and manned, the emergency brake system as disclosed herein may receive input from a remote command and a pilot present at flight time.

Figure 1:
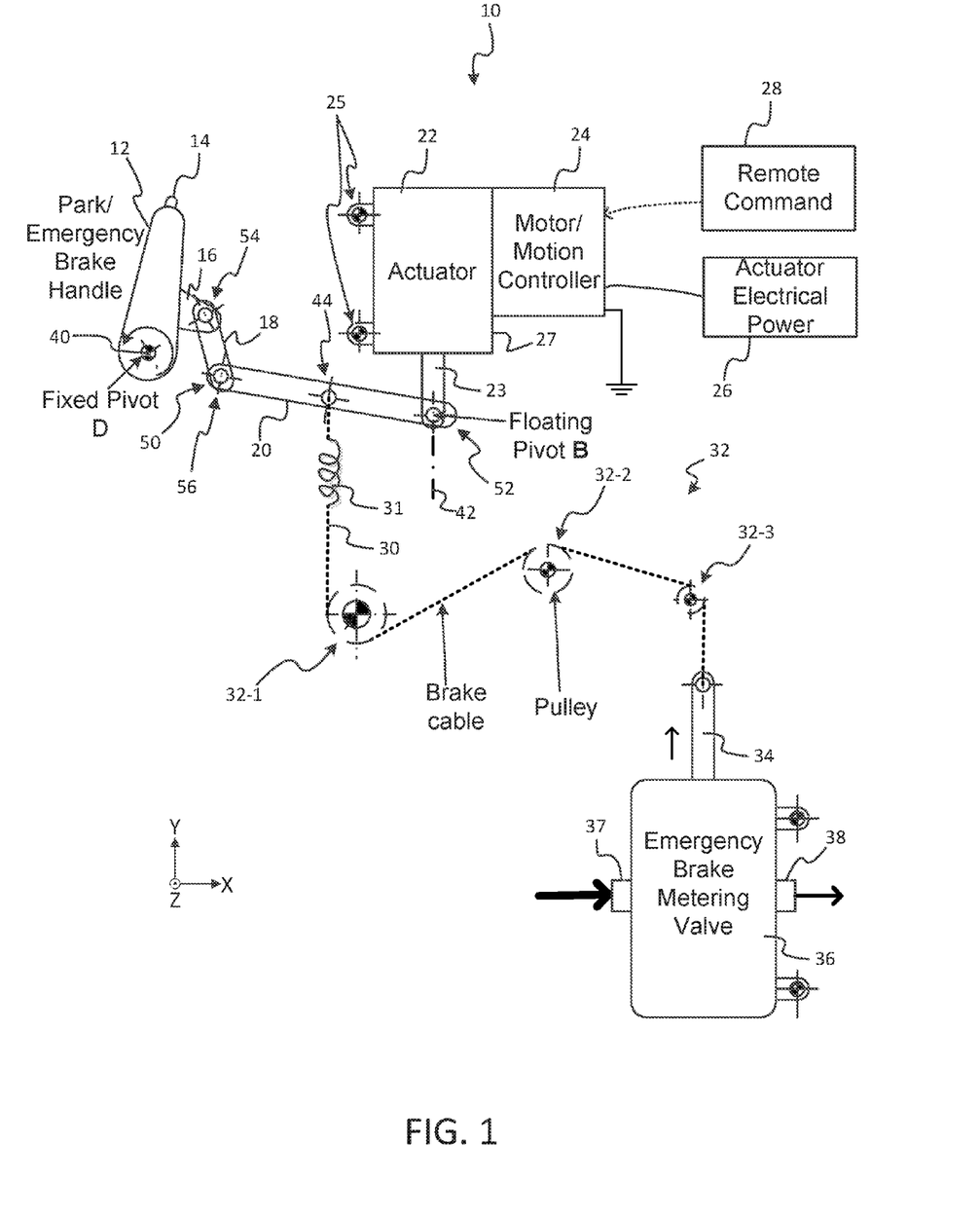
FIG. 1 illustrates an emergency brake system with the brake handle being rotated to a first position, in accordance with various embodiments.

With reference to FIG. 1, an emergency brake system 10 with a brake handle 12 being rotated to a first position is illustrated. In various embodiments, emergency brake system 10 may include a park/emergency brake handle (brake handle) 12, an idler link (link) 18, a summing lever (lever) 20, and a linear actuator (actuator) 22. Brake handle 12 may be configured to rotate about fixed pivot D. Brake handle 12 may be configured to rotate about first axis 40. Fixed pivot D may include a ratchet by which brake handle 12 may be locked in response to brake handle 12 rotating. For example, brake handle 12 may be rotated in the counter-clockwise direction as illustrated in FIG. 1. The ratchet may prevent brake handle 12 from rotating in the clockwise direction. Brake handle 12 may include a release button 14. Release button 14 may release the ratchet to allow brake handle 12 to rotate about first axis 40 relatively freely.

In various embodiments, brake handle 12 may include attachment feature 16. Attachment feature 16 may comprise a lug, a tab, a bell crank, or any other attachment feature for attaching link 18 to brake handle 12. Link 18 may be pivotally coupled to brake handle 12. Lever 20 may be pivotally coupled to link 18. Link 18 may be coupled between lever 20 and brake handle 12.

In various embodiments, lever 20 may be coupled to actuator 22. Actuator 22 may comprise a precision linear actuator. In various embodiments, as illustrated in FIG. 1 through FIG. 4, actuator 22 may be rigidly coupled to a fixed structure via attachment features 25. Actuator 22 may comprise a first plunger 23 and a housing 27. First plunger 23 may be configured to extend from and retract into housing 27 of actuator 22. First plunger 23 may extend and/or retract along second axis 42. In various embodiments, the orientation of second axis 42 may be fixed relative to first axis 40. As illustrated in FIG. 1, second axis 42 may be orthogonal to first axis 40. Lever 20 may be coupled to actuator 22 via first plunger 23. Lever 20 may be rotatably coupled to first plunger 23. In this regard, lever 20 may be coupled between actuator 22 and link 18.

A motion controller 24 may be coupled to actuator 22 for controlling first plunger 23. In various embodiments, motor/motion controller 24 may comprise a motor. In various embodiments, motor/motion controller 24 may comprise a controller. Motor/motion controller 24 may include a processor in electronic communication with a memory. Motor/motion controller 24 may be electronically coupled to actuator electrical power 26. Actuator electrical power 26 may comprise a power supply such as a generator, a battery, or any other source of electrical power. Motor/motion controller 24 may receive actuator electrical power 26 for controlling the motor.

Motion controller 24 may receive a remote command 28. Remote command 28 may be received via a wireless communication such as via satellite, radio, infrared, or any other form of wireless communication. For example, emergency brake system 10 may be located on an aircraft in flight and remote command 28 may be received from a ground station. In various embodiments, remote command 28 may comprise an emergency command. In various embodiments, actuator 22 may actuate in response to remote command 28. Stated another way, first plunger 23 may extend and/or retract in response to remote command 28.

In various embodiments, summing lever 20 may comprise a first end 50 and a second end 52. Link 18 may comprise a first terminus 54 and a second terminus 56. First terminus 54 may be coupled to brake handle 12. Second terminus 56 may be coupled to first end 50. Second end 52 may be coupled to first plunger 23. First end 50 may be pivotally coupled to second terminus 56.

In various embodiments, emergency brake system 10 may include a brake cable 30. In various embodiments, brake cable 30 may comprise a push/pull cable. In various embodiments, brake cable 30 may include a bias, such as a spring 31 for example, coupled in-line brake cable 30. Brake cable 30 may be coupled to lever 20. In various embodiments, brake cable 30 may be coupled to point 44 of lever 20. In various embodiments, point 44 may comprise a midpoint of lever 20. In various embodiments, brake cable 30 may be pivotally coupled to lever 20. A plurality of pulleys 32 may be included for directing or routing brake cable 30. For example, a first pulley 32-1, a second pulley 32-2, and a third pulley 32-3 may be provided for directing brake cable 30.

In various embodiments, emergency brake system 10 may include an emergency brake metering valve (valve) 36. Valve 36 may include a second plunger 34 configured to extend from and retract into valve 36. Valve 36 may meter a hydraulic pressure, for example, a hydraulic pressure being applied to a brake of a vehicle. Valve 36 may include an input 37 and an output 38. Hydraulic pressure supplied to the output 38 may vary in response to second plunger 34 extending from and/or retracting into valve 36. Brake cable 30 may be coupled to valve 36. Brake cable 30 may be coupled to second plunger 34.

In various embodiments, valve 36 may be configured to actuate in response to brake handle 12 pivoting about first axis 40. Second plunger 34 may be configured to extend from (in the positive y-direction) valve 36 in response to brake handle 12 being rotated in the counter-clockwise direction about first axis 40. In this regard, link 18 may pull first end 50 of lever 20 in the positive y-direction, rotating lever 20 about floating pivot B—which is now a fixed pivot by way of plunger 23 not moving—in the clockwise direction, in response to brake handle 12 being rotated in the counter-clockwise direction. Consequently, point 44 of lever 20 may be moved in the positive y-direction, thus pulling brake cable 30 and extending second plunger 34 from valve 36.

Figure 2:
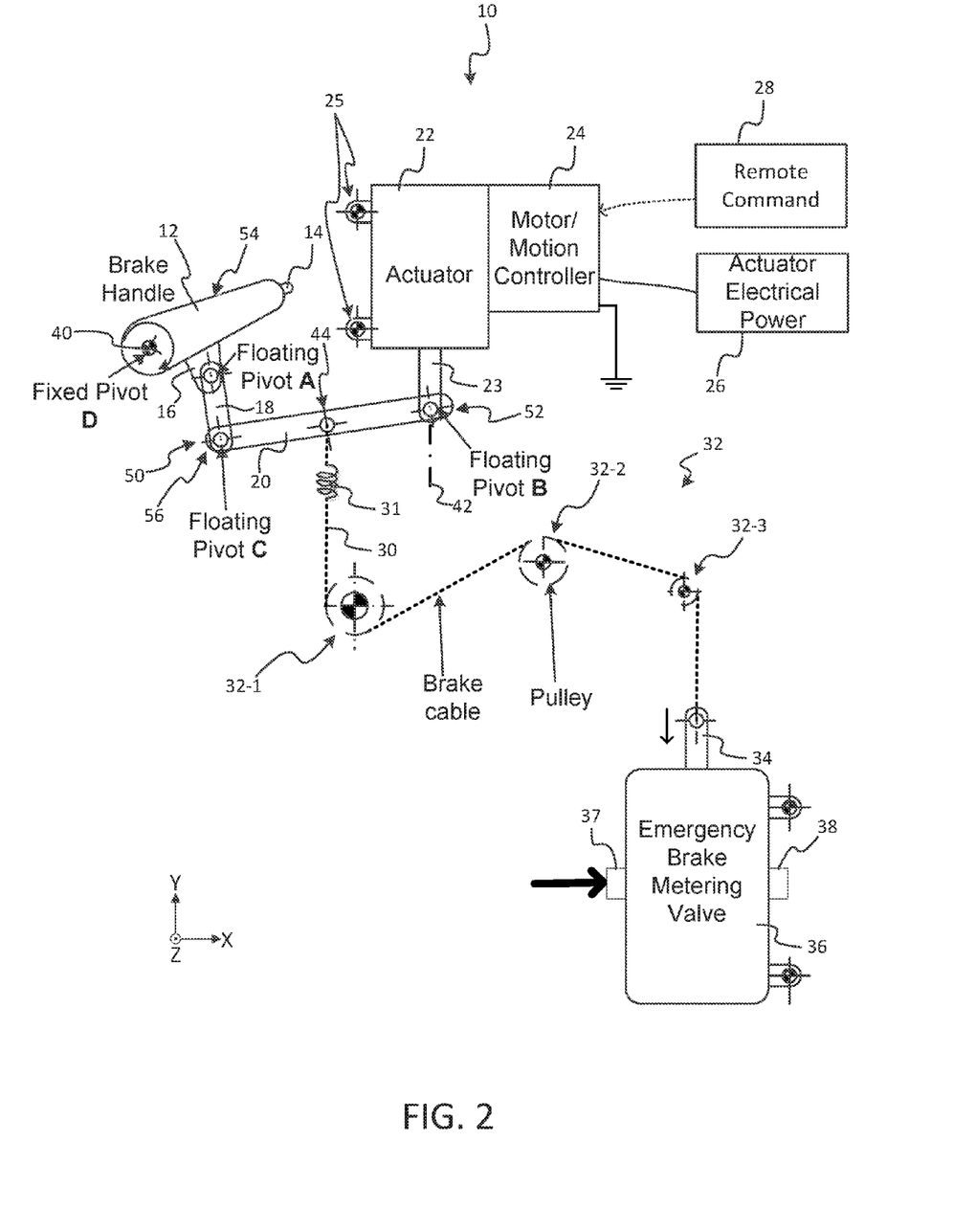
FIG. 2 illustrates an emergency brake system with the brake handle being rotated to a second position, in accordance with various embodiments.
Figure 3:
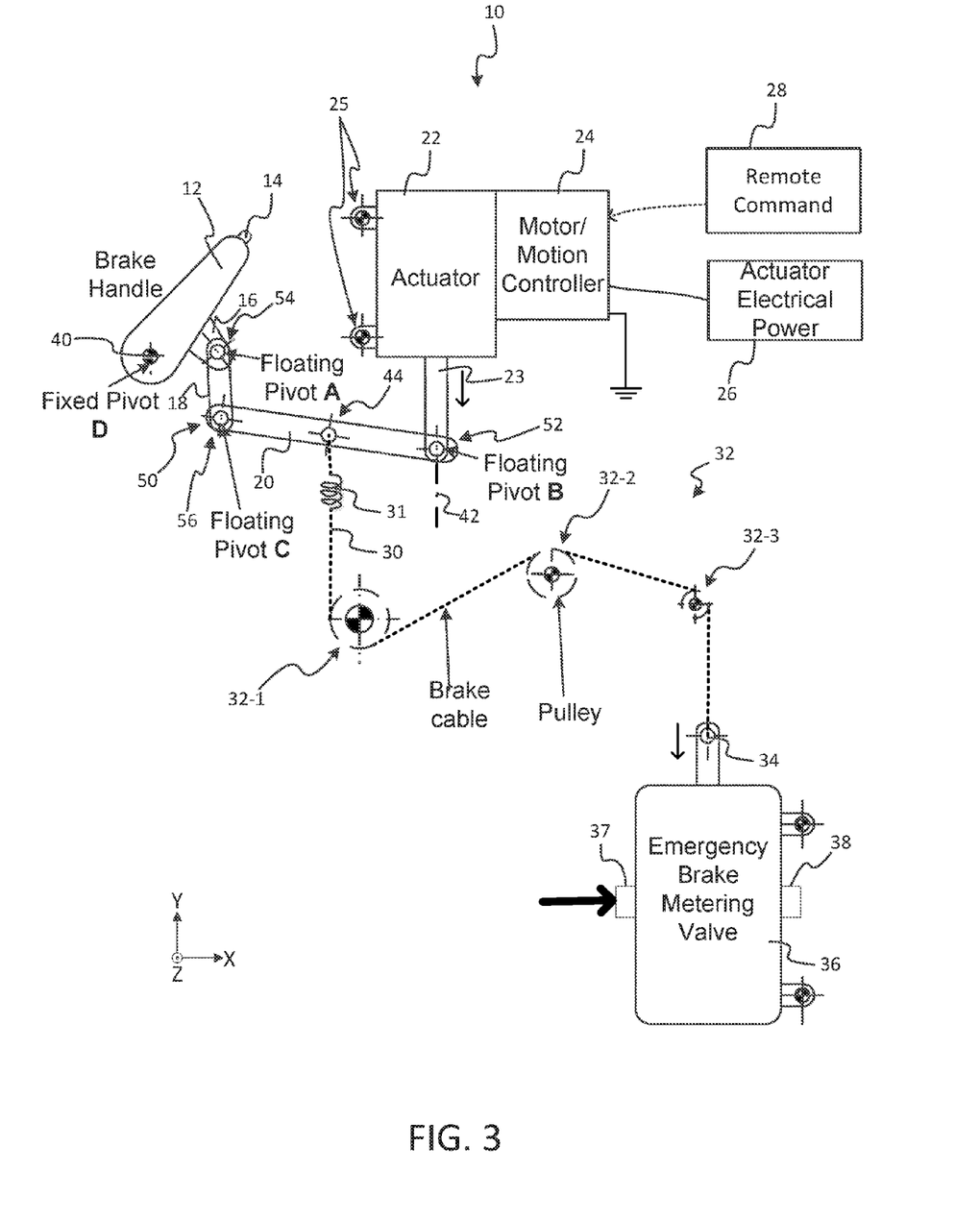
FIG. 3 illustrates an emergency brake system with the linear actuator plunger in an extended position, in accordance with various embodiments.
Figure 4:
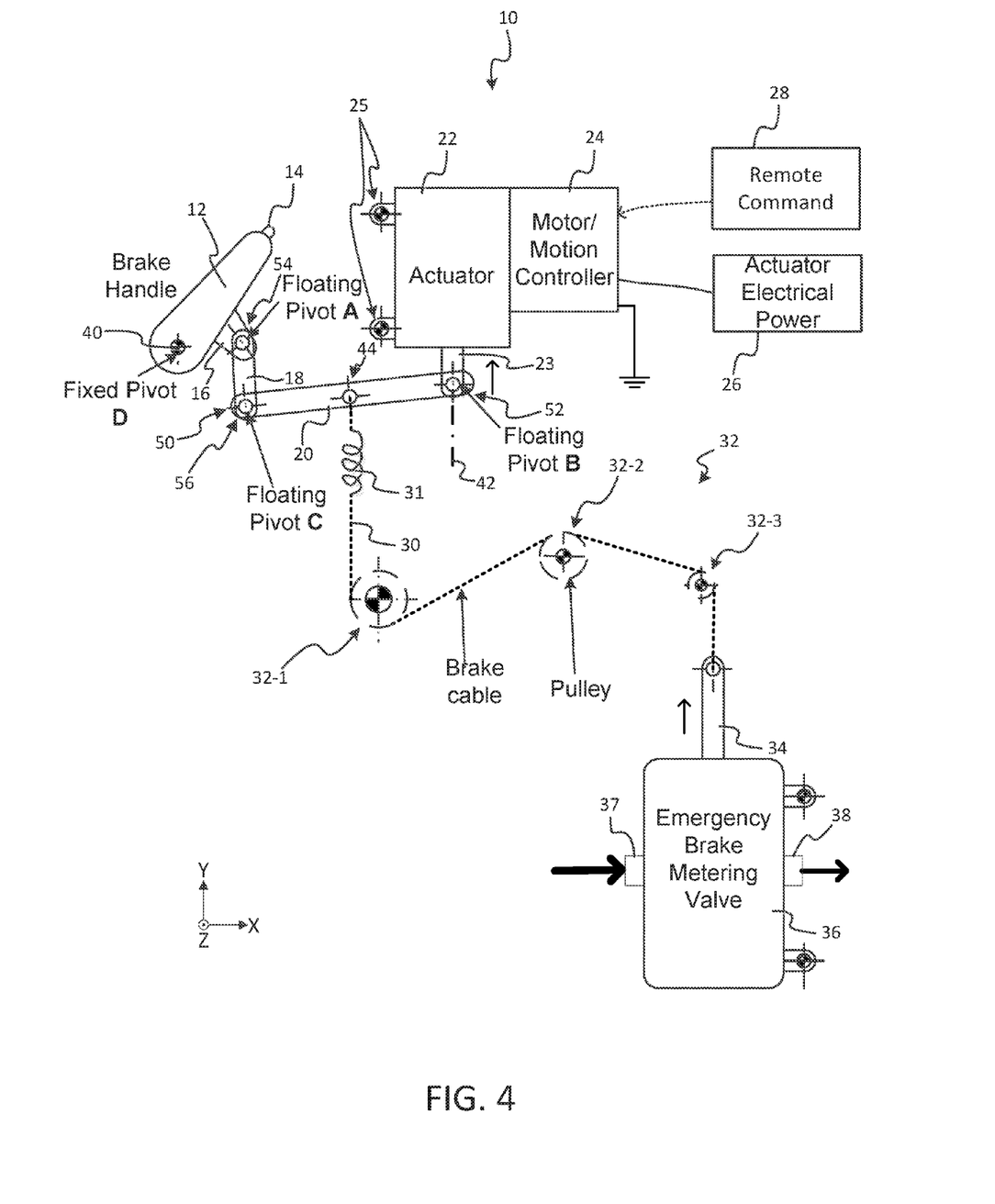
FIG. 4 illustrates an emergency brake system with the linear actuator plunger in a retracted position, in accordance with various embodiments.

With respect to FIG. 2 through FIG. 4, elements with like element numbering, as depicted in FIG. 1, are intended to be the same and will not necessarily be repeated for the sake of clarity.

With reference to FIG. 2, emergency brake system 10 with the brake handle 12 being rotated to a second position is illustrated, in accordance with various embodiments. In various embodiments, valve 36 may be configured to actuate in response to brake handle 12 pivoting about first axis 40 in the clockwise direction. Second plunger 34 may be configured to retract into (in the negative y-direction) valve 36 in response to brake handle 12 being rotated in the clockwise direction about first axis 40. In this regard, link 18 may push first end 50 of lever 20 in the negative y-direction, rotating lever 20 about floating pivot B in the counter-clockwise direction, in response to brake handle 12 being rotated in the clockwise direction. Consequently, point 44 of lever 20 may be moved in the negative y-direction, thus allowing brake cable 30 to contract, via spring 31, and decreasing the force applied to second plunger 34, thus allowing second plunger 34 to retract into valve 36.

With combined reference to FIGS. 1 and 2 in response to the input method being the handle 12, the combined mechanism of link 18 and lever 20 may be articulated about pivot B which becomes a fixed pivot because the plunger 23 is held in position.

With reference to FIG. 3, emergency brake system 10 with first plunger 23 in an extended position is illustrated, in accordance with various embodiments. In various embodiments, valve 36 may be configured to actuate in response to first plunger 23 moving along second axis 42. Second plunger 34 may be configured to retract into (in the negative y-direction) valve 36 in response to first plunger 23 extending from actuator 22. In this regard, first plunger 23 may push second end 52 of lever 20 in the negative y-direction, rotating lever 20 about floating pivot C in the clockwise direction, in response to first plunger 23 extending from actuator 22. Consequently, point 44 of lever 20 may be moved in the negative y-direction, thus allowing brake cable 30 to contract, via spring 31, and decreasing the force applied to second plunger 34, thus allowing second plunger 34 to retract (in the negative y-direction) into valve 36.

With reference to FIG. 4, emergency brake system 10 with first plunger 23 in a retracted position is illustrated, in accordance with various embodiments. Second plunger 34 may be configured to extend from (in the positive y-direction) valve 36 in response to first plunger 23 retracting into actuator 22. In this regard, first plunger 23 may pull second end 52 of lever 20 in the positive y-direction, rotating lever 20 about floating pivot C in the counter-clockwise direction, in response to first plunger 23 retracting into or towards actuator 22. Consequently, point 44 of lever 20 may be moved in the positive y-direction, thus applying a pulling force onto brake cable 30 to pull second plunger 34 to an extended position relative to valve 36.

With combined reference to FIGS. 3 and 4, in response to the input method being plunger 23, the combined mechanism of link 18 and lever 20 may be articulated about pivot A which becomes a fixed pivot because the handle 12 is held in position.

With respect to FIG. 5 through FIG. 8, elements with like element numbering, as depicted in FIG. 1 through FIG. 4, are intended to be the same and will not necessarily be repeated for the sake of clarity.

Figure 5:
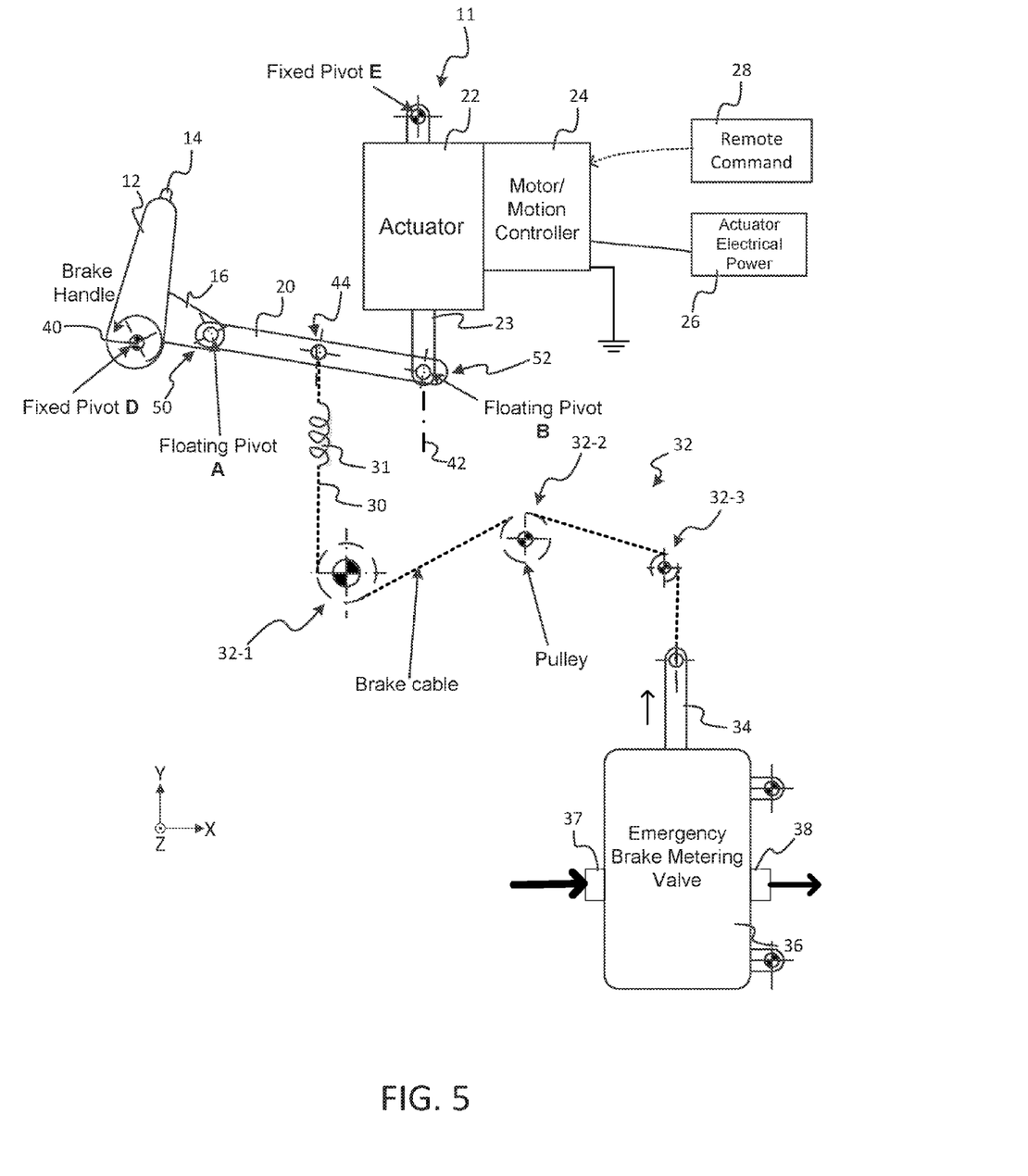
FIG. 5 illustrates an emergency brake system with the brake handle being rotated to a first position, in accordance with various embodiments.

With reference to FIG. 5, an emergency brake system 11 with the brake handle 12 being rotated to a first position is illustrated. In various embodiments, emergency brake system 11 may be similar to emergency brake system 10 (see FIGS. 1-4). Emergency brake system 11 may include brake handle 12, lever 20, and actuator 22. First end 50 of lever 20 may be pivotally coupled to brake handle 12. In various embodiments, actuator may be pivotally coupled to a fixed structure via fixed pivot E. In this regard, actuator 22 may pivot about fixed pivot E. In this regard, emergency brake system 11 includes similar features as emergency brake system 10. Elements included in emergency brake system 11 having like element numbering as elements included in emergency brake system 10 are intended to be the same.

Second plunger 34 may be configured to extend from (in the positive y-direction) valve 36 in response to brake handle 12 being rotated in the counter-clockwise direction about first axis 40. In this regard, attachment feature 16 may pull first end 50 of lever 20 in the positive y-direction, rotating lever 20 about floating pivot B in the clockwise direction, in response to brake handle 12 being rotated in the counter-clockwise direction. Consequently, point 44 of lever 20 may be moved in the positive y-direction, thus pulling brake cable 30 and extending second plunger 34 from valve 36. In various embodiments, actuator 22 may pivot about fixed pivot E in response to brake handle 12 pivoting about fixed pivot D.

Figure 6:
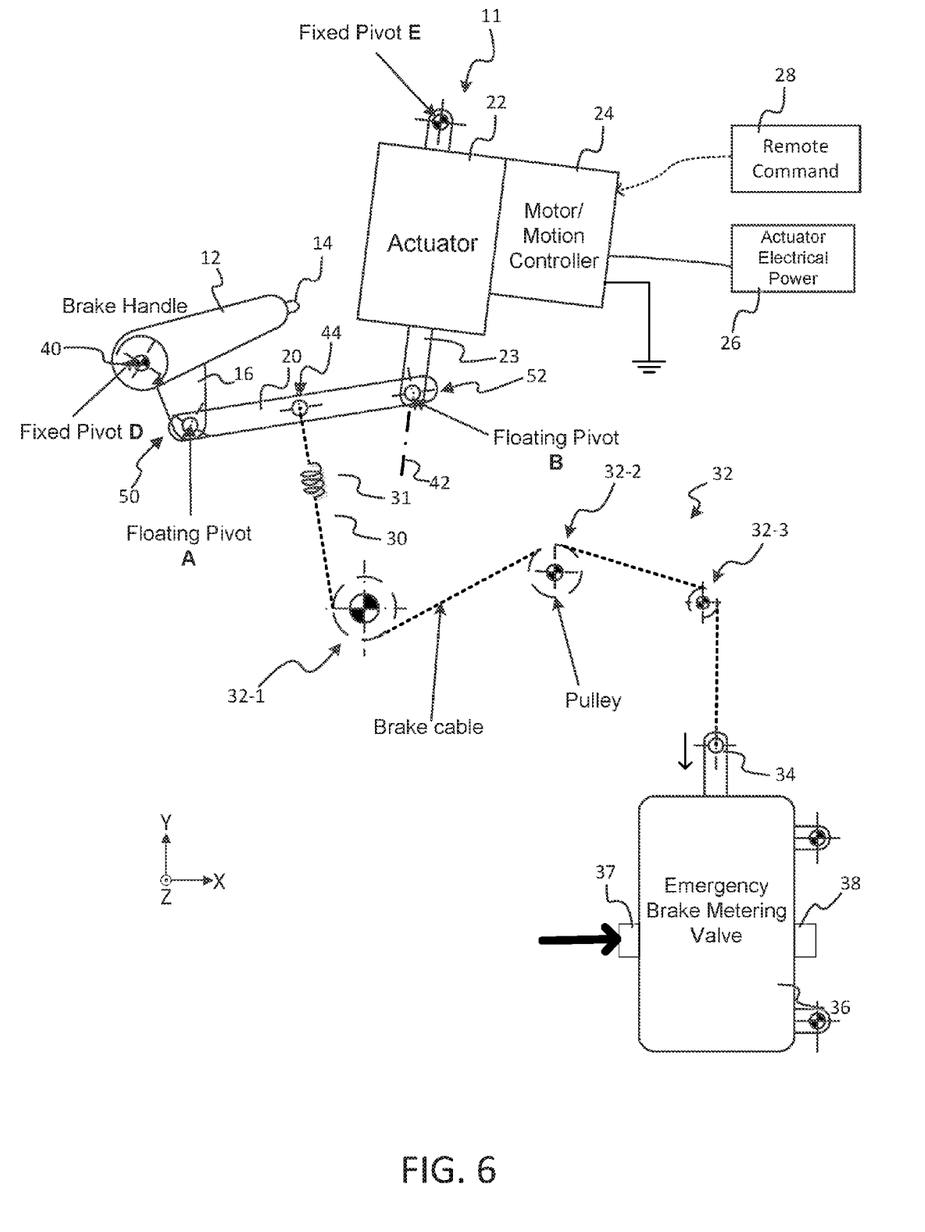
FIG. 6 illustrates an emergency brake system with the brake handle being rotated to a second position, in accordance with various embodiments.
Figure 7:
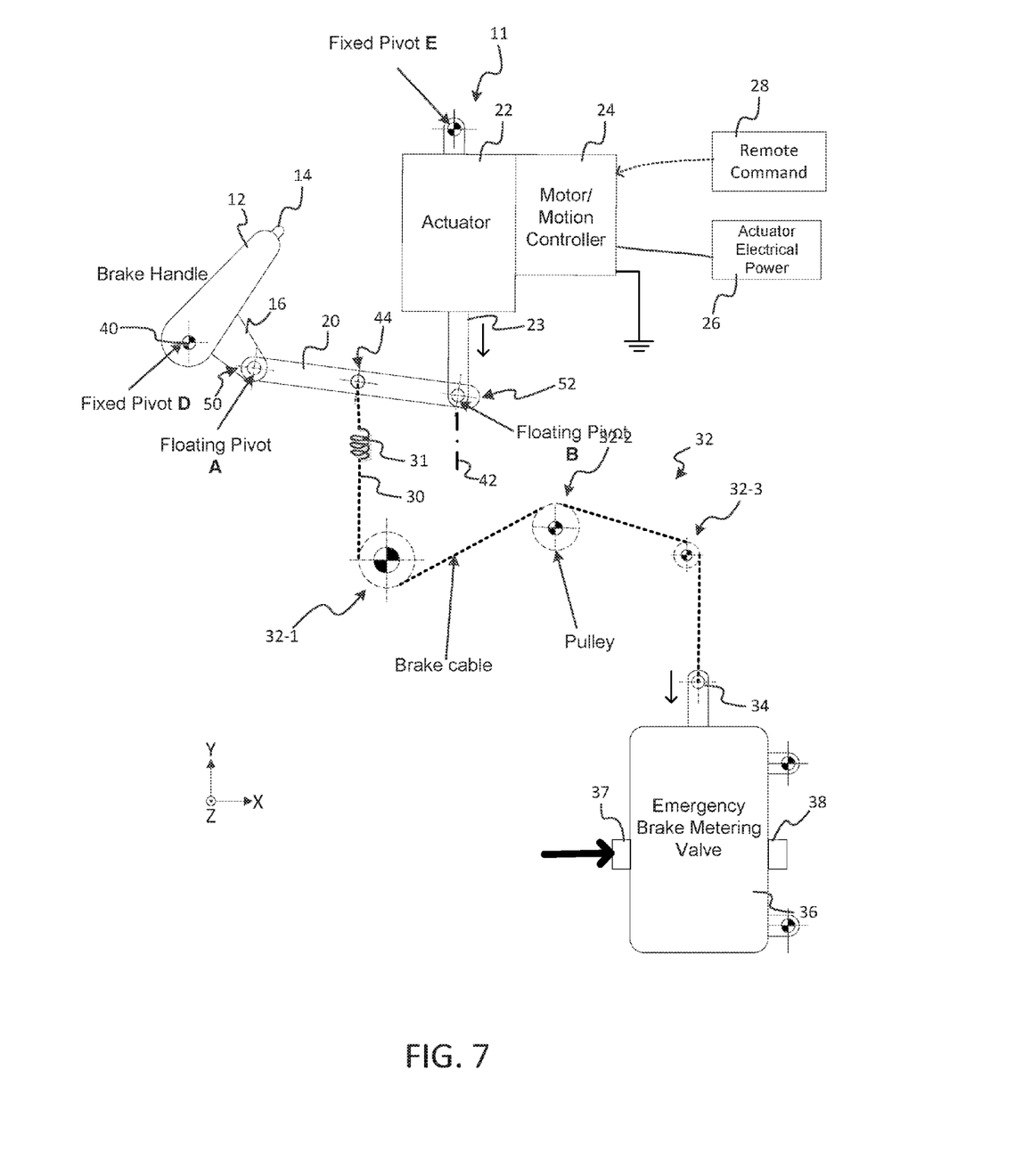
FIG. 7 illustrates an emergency brake system with the linear actuator plunger in an extended position, in accordance with various embodiments.
Figure 8:
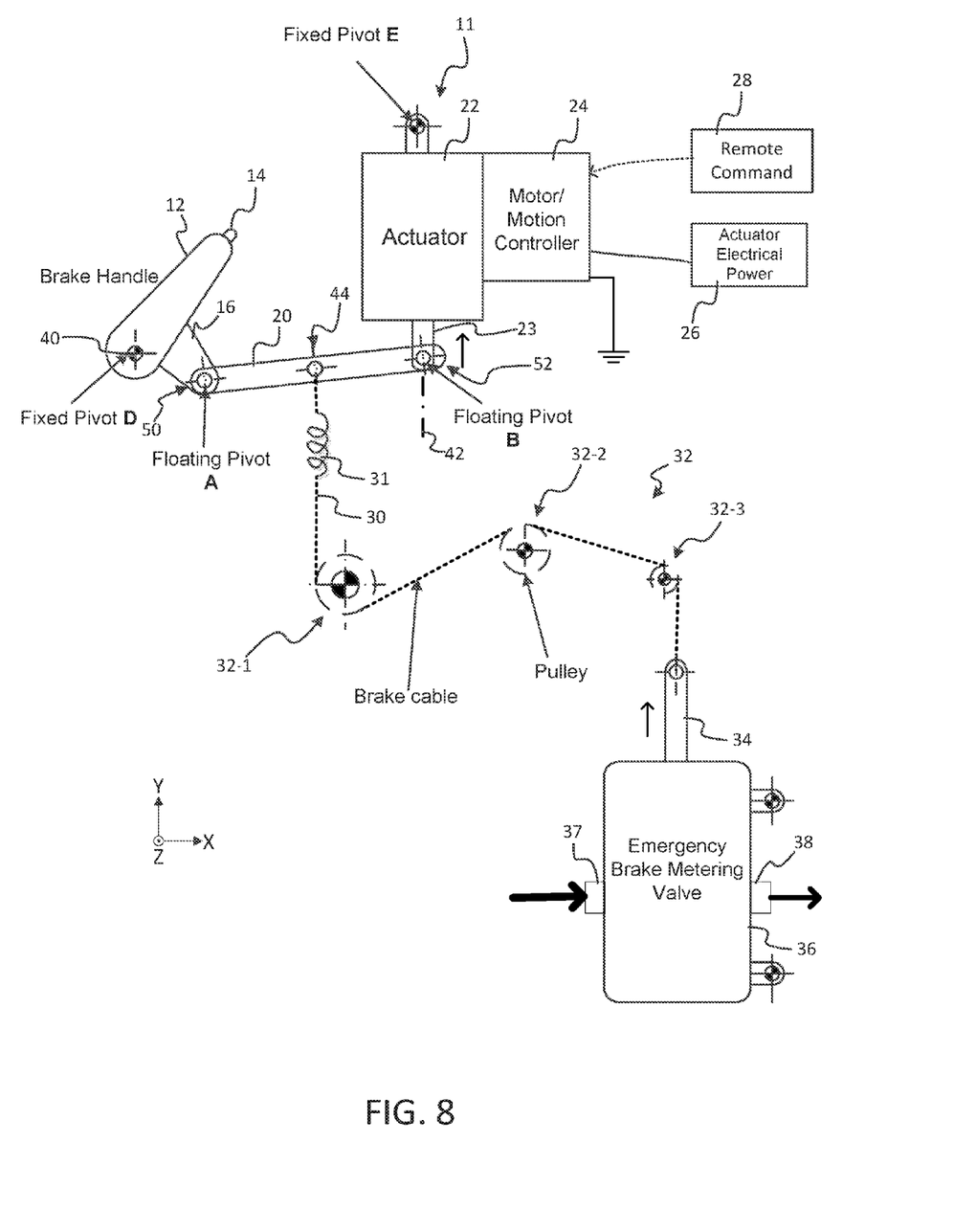
FIG. 8 illustrates an emergency brake system with the linear actuator plunger in a retracted position, in accordance with various embodiments.

With respect to FIG. 6 through FIG. 8, elements with like element numbering, as depicted in FIG. 5, are intended to be the same and will not necessarily be repeated for the sake of clarity.

With reference to FIG. 6, emergency brake system 11 with the brake handle 12 being rotated to a second position is illustrated, in accordance with various embodiments. In various embodiments, valve 36 may be configured to actuate in response to brake handle 12 pivoting about first axis 40 in the clockwise direction. Second plunger 34 may be configured to retract into (in the negative y-direction) valve 36 in response to brake handle 12 being rotated in the clockwise direction about first axis 40. In this regard, attachment feature 16 may push first end 50 of lever 20 in the negative y-direction, rotating lever 20 about floating pivot B in the counter-clockwise direction, in response to brake handle 12 being rotated in the clockwise direction. Consequently, point 44 of lever 20 may be moved in the negative y-direction, thus allowing brake cable 30 to contract, via spring 31, and decreasing the force applied to second plunger 34, thus allowing second plunger 34 to retract into valve 36. In various embodiments, actuator 22 may pivot about fixed pivot E in response to brake handle 12 pivoting about fixed pivot D.

With combined reference to FIGS. 5 and 6, in response to the input method being handle 12, the combined mechanism of the actuator 22 and lever 20 may be articulated about fixed pivot E.

With reference to FIG. 7, emergency brake system 11 with first plunger 23 in an extended position is illustrated, in accordance with various embodiments. In various embodiments, valve 36 may be configured to actuate in response to first plunger 23 moving along second axis 42. Second plunger 34 may be configured to retract into (in the negative y-direction) valve 36 in response to first plunger 23 extending from actuator 22. In this regard, first plunger 23 may push second end 52 of lever 20 away from actuator 22 (in the negative y-direction), rotating lever 20 about floating pivot A in the clockwise direction, in response to first plunger 23 extending from actuator 22. Consequently, point 44 of lever 20 may be moved in the negative y-direction, thus allowing brake cable 30 to contract, via spring 31, and decreasing the force applied to second plunger 34, thus allowing second plunger 34 to retract (in the negative y-direction) into valve 36. In various embodiments, actuator 22 may pivot about fixed pivot E in response to first plunger 23 moving along second axis 42.

With reference to FIG. 8, emergency brake system 11 with first plunger 23 in a retracted position is illustrated, in accordance with various embodiments. Second plunger 34 may be configured to extend from (in the positive y-direction) valve 36 in response to first plunger 23 retracting into or towards actuator 22. In this regard, first plunger 23 may pull second end 52 of lever 20 towards actuator 22 (in the positive y-direction), rotating lever 20 about floating pivot A in the counter-clockwise direction, in response to first plunger 23 retracting into or towards actuator 22. Consequently, point 44 of lever 20 may be moved in the positive y-direction, thus applying a pulling force onto brake cable 30 to pull second plunger 34 to an extended position relative to valve 36, as illustrated in FIG. 8. In various embodiments, actuator 22 may pivot about fixed pivot E in response to first plunger 23 moving along second axis 42 to prevent mechanical lock of emergency brake system 11.

Figure 9:
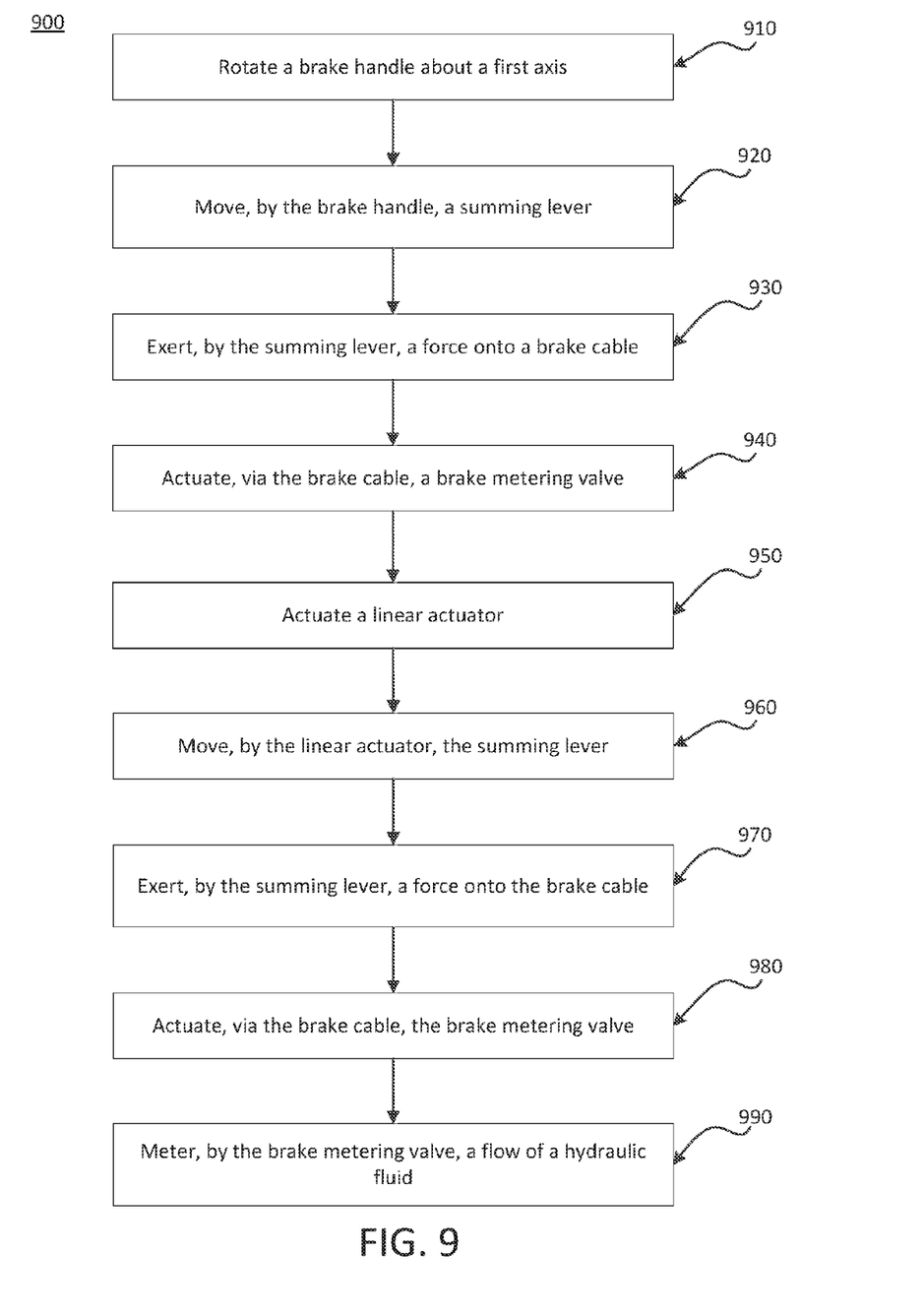
FIG. 9 provides a method for controlling a brake metering valve, in accordance with various embodiments.

With combined reference to FIGS. 7 and 8, in response to the input method being plunger 23, the combined mechanism of actuator 22 and lever 20 may be be articulated about pivot A which becomes a fixed pivot because the handle 12 is held in position With reference to FIG. 9, a method 900 for controlling brake metering valve 36 is illustrated, in accordance with various embodiments. Method 900 includes rotating a brake handle about a first axis (step 910). Method 900 includes moving, by the brake handle, a summing lever (step 920). Method 900 includes exerting, by the summing lever, a force onto a brake cable (step 930). Method 900 includes actuating, via the brake cable, a brake metering valve (step 940). Method 900 includes actuating a linear actuator (step 950). Method 900 includes moving, by the linear actuator, the summing lever (step 960). Method 900 includes exerting, by the summing lever, a force onto the brake cable (step 970). Method 900 includes actuating, via the brake cable, the brake metering valve (step 980). Method 900 includes metering, by the brake metering valve, a flow of a hydraulic fluid (step 990).

With combined reference to FIG. 1 and FIG. 9, Step 910 may include rotating a brake handle 12 about a first axis 40. Step 920 may include moving, by the brake handle 12, a summing lever 20. Step 930 may include exerting, by the summing lever 20, a force onto a brake cable 30. Step 940 may include actuating, via the brake cable 30, a brake metering valve 36. Step 950 may include actuating an actuator 22. Step 960 may include moving, by the actuator 22, the summing lever 20. Step 970 may include exerting, by the summing lever 20, a force onto the brake cable 30. Step 980 may include actuating, via the brake cable 30, valve 36. Step 990 may include metering, by valve 36, a flow of a hydraulic fluid.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An emergency brake system comprising:
   a summing lever having a first end and a second end;
   an idler link coupled to the first end of the summing lever;
   a brake handle coupled to the idler link, the brake handle rotatably coupled about a first axis;
   a linear actuator having a plunger, the plunger being coupled to the second end of the summing lever; and
   a brake cable coupled to the summing lever at a location between the first end and the second end;
   wherein the idler link is coupled between the summing lever and the brake handle.

2. The emergency brake system of claim 1, wherein the summing lever comprises a first end and a second end and the idler link comprises a first terminus and a second terminus, the first terminus being coupled to the brake handle, the second terminus being coupled to the first end, and the second end being coupled to the plunger.

3. The emergency brake system of claim 2, wherein the second end is pivotally coupled to the plunger, the first end is pivotally coupled to the second terminus, and the first terminus is pivotally coupled to the brake handle.

4. The emergency brake system of claim 1, wherein the plunger is configured to at least one of retract or extend from the linear actuator along a second axis.

5. The emergency brake system of claim 4, wherein the second axis is fixed relative to the first axis.

6. The emergency brake system of claim 1, further comprising a brake metering valve, the brake cable being coupled to the brake metering valve.

7. The emergency brake system of claim 6, wherein the brake metering valve is configured to actuate in response to the brake handle pivoting about the first axis.

8. The emergency brake system of claim 6, wherein the brake metering valve is configured to actuate in response to the plunger moving along the second axis.

9. An emergency brake system comprising:
   a summing lever having a first end and a second end;
   a brake handle coupled to the first end of the summing lever, the brake handle rotatably coupled about a first axis;
   a linear actuator having a plunger, the plunger being coupled to the second end of the summing lever; and
   a brake cable coupled to the summing lever at a location between the first end and the second end,
   wherein the summing lever is configured to rotate about the first end in response to the plunger at least one of extending from and retracting into the linear actuator.

10. The emergency brake system of claim 9, wherein the linear actuator comprises an attachment feature, the linear actuator being rotatable about the attachment feature.

11. The emergency brake system of claim 9, wherein the second end of the summing lever is pivotally coupled to the plunger and the first end of the summing lever is pivotally coupled to the brake handle.

12. The emergency brake system of claim 9, wherein the plunger is configured to at least one of retract or extend from the linear actuator along a second axis.

13. The emergency brake system of claim 12, wherein an orientation of the second axis moves in response to the brake handle rotating about the first axis.

14. The emergency brake system of claim 9, further comprising a brake metering valve, the brake cable being coupled to the brake metering valve.

15. The emergency brake system of claim 14, wherein the brake metering valve is configured to actuate in response to the brake handle pivoting about the first axis.

16. The emergency brake system of claim 14, wherein the brake metering valve is configured to actuate in response to the plunger moving along the second axis.

17. A method of controlling a brake metering valve comprising:
   rotating a brake handle about a first axis, the brake handle being coupled to a first end of a summing lever;
   moving, by the brake handle, the summing lever in response to the rotating;
   rotating, by the summing lever, about a plunger for a linear actuator, wherein the plunger is coupled to a second end of the summing lever;
   exerting, by the summing lever, a force onto a brake cable, in response to the moving the summing lever by the brake handle, wherein the brake cable is coupled to the summing lever at a location between the first end and the second end; and
   actuating, via the brake cable, the brake metering valve, in response to the exerting the force.

18. The method of claim 17, further comprising:
   actuating a linear actuator;
   moving, by the linear actuator, the summing lever in response to the actuating the linear actuator;
   exerting, by the summing lever, a second force onto the brake cable, in response to the moving the summing lever by the linear actuator;
   actuating, via the brake cable, the brake metering valve, in response to the exerting the second force; and
   metering, by the brake metering valve, a flow of hydraulic fluid, in response to the actuating the brake metering valve in response to at least one of the exerting the force or exerting the second force.

* * * * *